Figure 1:
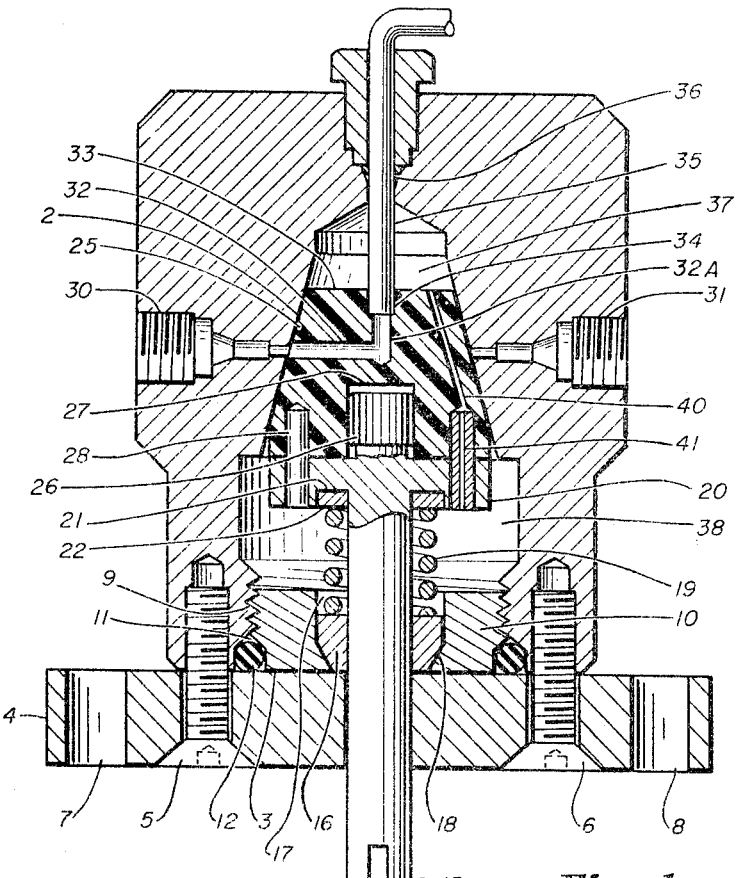

Nov. 29, 1966    C. R. FERRIN ET AL    3,288,432
VALVE
Original Filed July 2, 1963

INVENTORS
CHARLES R. FERRIN
BOBBY J. RUTHERFORD
BY

ATTORNEY

United States Patent Office 3,288,432
Patented Nov. 29, 1966

3,288,432
VALVE
Charles R. Ferrin and Bobby J. Rutherford, Tulsa, Okla., assignors to National Tank Company, Tulsa, Okla., a corporation of Nevada
Continuation of application Ser. No. 292,329, July 2, 1963. This application Oct. 22, 1965, Ser. No. 500,628
1 Claim. (Cl. 251—310)

This application is a continuation of our pending application Serial No. 292,329, filed July 2, 1963, and now abandoned.

The present invention relates to valves which use a cone-shaped element, the element rotated to align its passages in receiving and transmitting fluid between conduits connected to the body of the valve.

There are many harsh problems in constructing a valve to operate effectively under wide variations of temperature and pressure. These harsh problems become specific and acute when controlling the relatively small streams of industrial instruments, such as chromatographs.

In general, cone-shaped, rotated valve elements require mating with cone-shaped seating surfaces. These movable elements are usually urged with a resilient force upon their seats. Of course, one way to maintain dimensional stability between a movable element and its seat is to form these two parts of the valve of the same material. However, if the surfaces are both of metal, they will tend to seize and gall each other as the movable element is rotated while pressed against its seat surface. These valves have a critical problem in properly sealing between the two surfaces as they move over each other; the friction should be as low as possible while the sealing between the surfaces should be as effective as possible.

The cone-shaped valve element is, specifically, in the form of a frustum of a cone. The ends of this conical frustum are exposed to pressure, usually a combination of the pressures of the fluids controlled by the valve. When the fluid pressures are relatively high, and they are applied to the ends of the conical frustum of the movable valve element, the force exerted on the element in the direction to seat the element on its sealing surface will vary as the pressure of the fluid applied to the ends of the element. The resultant force of this differential pressure may, or may not, be in the correct direction to help the movable element of the valve seat and remain effective in controlling the fluid pressures diverted by the valve. However, this differential pressure force is a variable in the valve operation which it is desired to eliminate. It is desirable to seat the movable valve element by a spring of calculated force. It is desirable to eliminate the varying force of differential fluid pressure across the movable valve element.

As valves of this type are made smaller, coupling the actuating shaft to the element becomes a greater problem. The drive shaft may be connected to one end or the other of the conical frustum. Providing a stable coupling between shaft and movable element is a problem.

A volume is often provided within the valve housing at each end of the movable element. It is feasible to introduce a fluid to be controlled into the housing cavity at the end of the movable valve element which is not connected to the actuating shaft. The capacity of this housing volume may be undesirably large for the amount of controlled fluid passing through the valve. In other words, the extremely small flows associated with chromatographs may find the volume at the end of the movable element great enough to introduce an unacceptable lag in operation of the chromatograph sample system. This volume must be substantially reduced, or eliminated.

Finally, the sealing about the actuating shaft can become quite a problem at the wide variations of temperatures and pressure that are often encountered. Use of the simple O-ring gasket may not be practical. In chromatographic apparatus it is extremely important that valves of the chromatograph be properly sealed about the actuating shaft of the valves.

A principal object of the present invention is to provide a contact between a movable valve element in the shape of a conical frustum and a seating surface which is self-lubricated yet effectively sealed.

Another object is to eliminate differential fluid pressure across the end faces of a cone-shaped valve element.

Another object is to effectively couple a shaft and rotated cone-shaped valve element.

Another object is to reduce, if not eliminate, the volumetric capacity within a valve housing from the capacity of the conduits of the valve conducting fluid.

Another object is to effectively seal the access opening in the housing of a cone-shaped valve element and about the shaft extending out of the interior of the valve housing.

The present invention contemplates a cone-shaped valve element of polytetrafluorethylene (Teflon). Further, the invention contemplates a fluid passage between the ends of the valve element to equalize pressure across the ends of the valve element.

Further, the invention contemplates introducing a tube through the valve housing and into an axial passage at the end of the movable, rotated valve element to isolate the fluid brought to the valve from the capacity of the valve housing. Further, the invention contemplates a knurled end of an actuating shaft forced into a hole in one end of the cone-shaped element to couple the shaft and element together. Additionally, pins couple the shaft and movable valve element together, the pins being spaced from the axis of the shaft and extending through a structure on the shaft which extends transverse to the longitudinal axis of the shaft.

Further, it is contemplated that a plastic sealing washer be placed about the shaft and between the shaft and a closure plate for the valve body as part of the sealing structure for the valve body.

Figure 2:
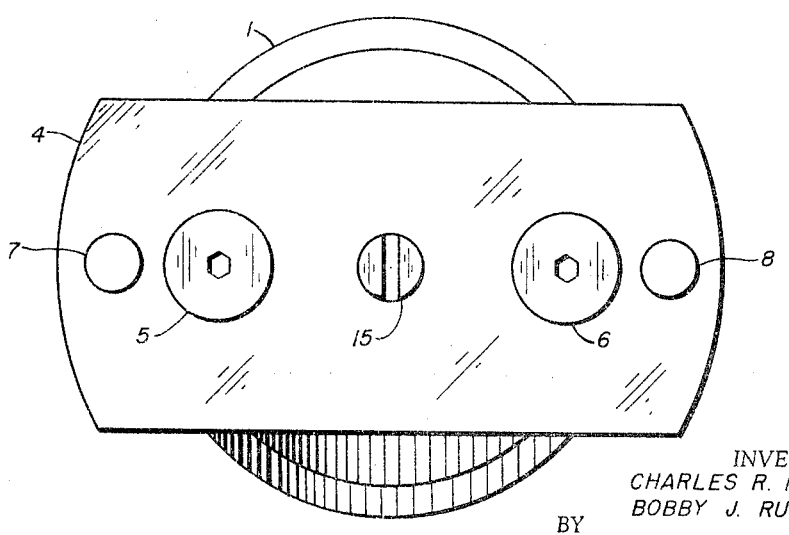

Other objects, advantages and features of this invention will become apparent to one skilled in the art upon consideration of the written specification, appended claim, and attached drawings, wherein;

FIG. 1 is a sectioned elevation of a valve in which the invention is embodied; and FIG. 2 is a plan view of the bottom of the valve of FIG. 1.

FIG. 1 illustrates the internal arrangement of the valve in which the invention is embodied. FIG. 2 shows that the body 1 of the valve is generally cylindrical. This body 1 is preferably of metal, bored to provide internal chamber 2 in which is rotated the movable element of the valve. An access opening 3 is provided by the boring operation. The movable valve element is inserted into chamber 2, and may be withdrawn therefrom, through this access opening.

A closure plate 4 is provided to seal access opening 3. The plate 4 is fastened directly to the body 1 with bolts 5 and 6. Also, plate 4 may be provided as a mount for the entire valve. Bolts, not shown, can extend through holes 7 and 8 to mount the entire valve on a panel, or other location.

Sealing of access opening 2

It is necessary that access opening 3 be sealed fluid tight. The surface of plate 4 is a prominent element of the structure with which the sealing is brought about. Resilient sealing structures are provided at the joints between body 1, plate 4 and the shaft turning the movable valve element. The arrangement of the elements of this sealing structure have several novel features.

Threads at 9 are provided in body 1, extending along the internal walls of the bore from access opening 3. A washer member 10 is threaded on its external surface and joins threads 9 in opening 3. Both the body 1 and metallic washer 10 are cut away from each other at 11 to provide a groove, or circular cavity, sized to receive O-ring 12. O-ring 12 is formed of resilient material and is pressed into engagement with the sides of groove 11 of the surface of plate 4 to prevent fluid from passing into, or out of, the chamber 2.

Shaft 15 is provided as a means with which to rotate the movable element of the valve. Shaft 15 extends through washer 16 by means of a central hole 17. Obviously, sealing is to be provided between washer 10 and shaft 15. Washer 16 is provided for this purpose.

Hole 17 of washer 10 is large enough in diameter to accommodate both shaft 15 and sealing washer 16. Toward plate 4 the sides of hole 17 are tapered at 18, toward shaft 15. Sealing washer 16 is formed to fit into hole 17, with its taper 18, tapered surface 18 becoming both a sealing surface by virtue of engagement with sealing washer 16 and means of urging the body of washer 16 into the sealing engagement with shaft 15. The internal bore of the washer 10 is sized to fit closely about shaft 15 while the external sides of the washer conform to the shape of the internal wall of hole 17 of washer 10.

Sealing washer 16 is urged against tapered surface 18 by spring 19. The material of the washer is thereby forced into engagement with the surface of shaft 16. Both the sealing washer 16 and O-ring 12 comprise the specific elements of the combination which consummate the sealing of the access opening 3, between plate 4, body 1, washer 10 and shaft 15.

Shaft 15

Shaft 15 has been generally described as extending into internal chamber 2 to rotate the movable element of the valve in controlling the fluid passages of the body of the valve with the fluid passages in the movable element of the valve. Shaft 15 performs this simple function that includes a unique coupling structure for the movable valve element.

The internal end of shaft 15, and that end extending into chamber 2, has a head portion 20 formed thereon. The diameter of head 20 is preferably an integral part of shaft 15, sized small enough to enter access opening 3. The movable valve element is mounted on the internal face of head 20 while the external face is engaged by the spring 19.

The external face of head portion 20 faces the access opening of body 1. A groove, or recess, 21 is formed about shaft 15 and in this external face. A ring 22 is placed in groove 21 to specifically bear on the end of compression spring 19. The opposite end of spring 19 bears upon sealing washer 16.

Spiral springs "dig" into surfaces they engage with their ends. Spring 19 digs into the engaging surface on ring 22 and the engaging surface on washer 16. As shaft 15 rotates, washer 22 is held by spring 19 and head portion 20 slides on the surface of washer 22 to actuate the movable element of the valve. Thus, spring 19 arranged about shaft 15, bearing on washer 16 by one end and washer 22 by the other end, serves the dual purpose of pressing washer 16 into its sealing engagement with washer 10 and shaft 15 while urging the movable element of the valve into seating engagement with the walls of internal chamber 2.

Movable valve element 25 is coupled to the internal face of head portion 20. In the smaller sizes for these valves, this coupling problem is a harsh challenge to the inventor because of space limitations. For this reason, the head portion 20 is coupled to the larger of the two end faces of rotated valve element 25.

More specifically, shaft 15 is extended beyond the internal face of head portion 20, this protuberance 26 being knurled. Valve element 25 is provided with an axial recess 27 and knurled end 26 is sized to be forced into recess 27. The knurling of protuberance 26 then grips the sides of recess 27, coupling shaft 15 to movable element 25.

In addition to the protuberance 26-recess 27 coupling combination, pins 28 are mounted at positions spaced transversely from the axis of shaft 15. Pins 28 extend through head portion 20 and into suitable holes in movable element 25. The combination of pins 28 and protuberance 26 complete the mechanical coupling between shaft 15 and movable valve element 25.

Teflon

Washer 16, ring 22 and rotated valve element 25 are preferably formed of Teflon. Teflon is a term used as a trademark by the Du Pont Company to designate its production of polytetrafluorethylene. This material is remarkable in several characteristics and is particularly suitable for the service illustrated here.

Teflon is readily machineable. Teflon can be readily "filled" with many materials to alter its hardness, coefficient of expansion or dimensional stability. Teflon is remarkably inert from a chemical standpoint and has the highest melting point of the plastics presently developed.

Probably the most remarkable characteristic of Teflon is its so-called self-lubricating quality. Basically, this self-lubricating quality results because of its relatively flat molecules. There are no cross-linking bonds between these relatively flat molecules; therefore, the molecules slide over each other readily. Graphite has much this same characteristic and for the same reasons. However, a body moulded from graphite has no cold flow characteristic. Further, it is difficult to obtain a molded graphite body without a high degree of porosity.

A body made of Teflon will cold flow to an extent, is self-lubricating, chemically inert and, therefore, is well suited to the service demanded of it in the present valve.

Rings 16 and 22 are made of Teflon, and as such, are excellent for providing bearing surfaces for the ends of spring 19. Forced by spring 19, ring 16 engages tapered surface 18 in an excellent sealing relationship. Additionally, the sides of shaft 15 are engaged in sealing relationship with ring 16. Ring 22 bears on the opposite end of spring 19 and engages the bottom of groove 21. As shaft 15-head portion 20 rotates, ring 22 will slide in groove 21 because of the low friction between the Teflon material of ring 22 and the metallic material of head portion 20. On the other side of head portion 20, the Teflon material of element 25 slides readily over the tapered walls of chamber 2. Thus, shaft 15 "floats" entirely on Teflon material. There is no metallic engagement between the structure of shaft 15, plate 4 and body 1. All engagements are through the Teflon of ring 16, ring 22 and element 25.

Movable valve element 25

Valve element 25 has been generally described as mechanically coupled to head portion 20. Further, element 25 has been described as having the shape of a conical frustum. Also, element 25 has been described as formed of Teflon plastic.

The walls of internal chamber 2 are given the same conical shape as the external surface of element 25. These two surfaces slide relative to each other as element 25 is rotated by shaft 15. Keep in mind that spring 19 is forcing element 25 on this conical seating surface of chamber 2. The engineered magnitude of this force will be governed by the range of fluid pressure being sealed. It is expected that the force will be fairly high as the industrial service of these valves often demand a fairly high fluid pressure. Body passages 30 and 31 are extended transverse the axis of shaft 15, through the walls of internal chamber 2. Passage 32 is formed in the body of element 25 and is shown aligned with body passage 30. If shaft 15 is rotated 180 degrees element passage 32 will align with passage 31.

Passage 32 is shown with an axial extension 32A. Passage 32A terminates in face 33 of movable element 25. Passage 32A is shown with a counterbore 34 in order to receive tube 35 which extends from body passage 36. Fluid introduced into valve body 1, by tube 35, can be passed to body passage 30, or alternately, to body passage 31 by rotation of valve element 25 by the turning of shaft 15.

The formation of internal chamber 2 is normally carried out to leave a body cavity 37 beyond face 33 of movable element 25. The capacity of this body cavity 37 could be an undesirable feature in certain systems employing this valve. For example, in the small volumes of fluid analyzed in a chromatograph, volume 37 could introduce an undesirable delay in the flow of a representative sample through the valve. Therefore, the provision for tube 25 to transmit a gas sample directly into conduit 32A, 32 and 30 is an important advantage of this arrangement. In effect, the capacity of cavity 37 can be isolated from the capacity of the conduit system in this arrangement.

Of course the pressure in conduit 35 can affect the pressure in cavity 37. It is not generally practical to seal conduit 35 into counterbore 34. On the other side of movable element 25 is body cavity 38. The pressure in cavity 38 may be substantially less than the pressure in body cavity 37. Thus, the differential across movable element 25 may be such as to oppose the force of spring 19. In all events, it is considered desirable from an engineering standpoint to fix the seating force of movable element 25 by spring 19 only. Therefore, a passage 40 has been provided through valve element 25. To overcome the problem of extending passage 40 through metallic head portion 20, pins 28 are provided with an axial passage 41 to complete the passage between body cavity 37 and body cavity 38. With this communication, pressure is equalized across the faces of movable element 25, leaving spring 19 to provide the calculated seating force of movable element 25 against the walls of the internal chamber 2.

As the Teflon material of moveable element 25 is rotated against the tapered walls of internal chamber 2, a film of Teflon is deposited on the chamber walls. This film provides a low frictional resistance between the rotated element 25 and the chamber 2 walls. At the same time, a high sealing efficiency is maintained so the fluid of the conduit is contained within the passages of the valve and the passages joined by the valve. Further, if there are slight variations in the taper between the chamber walls and the element 25, the Teflon material of the element 25 will cold flow as necessary to conform the two surfaces to each other.

The foregoing structure provides a valve suited for the problems of high temperature-high pressure service. Small fluid streams, such as those of samples and carrier gas in a chromatograph system, are directed and controlled with precision and efficiency.

The basic design of a cone-shaped movable element insures a large seating surface. Spring-pressing this cone-shaped element on its seat insures an engineered force to seal the fluid in the passages.

The use of Teflon as the material for this movable element of the valve provides a self-lubricated surface between the element and its seat. Further, the Teflon can be controlled to required dimensional stability by filling. The dimensional stability under temperature and pressure changes is extremely important where the body passages and element passages are small and therefore require precise alignment.

The elimination of fluid differential pressure across the valve element is provided by passages 40 and 41.

The coupling of the element to turning shaft 15 is provided by the knurled end 26 and pins 28. The volume 37 is isolated by alignment of passage 32A with a body passage so tube 36 will extend into counterbore 34. The sealing about shaft 15 is provided by the combination of ring 10 and Teflon sealing washer 16.

From the foregoing it will be seen that this invention is one well adapted to attain all of the ends and objects hereinabove set forth, together with other advantages which are obvious and which are inherent to the apparatus.

It will be understood that certain features and sub-combinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

A valve including;
 a body member having formed therein,
  (a) a central chamber with conical walls,
  (b) an access opening into the central chamber,
  (c) and passages for fluid connecting from external the body into the chamber;
 a plug of polytetrafluorethylene with a conical frustum shape sized to seal on the conical walls of the body chamber and having passages formed therein to align with body passages in a predetermined sequence as the plug is rotated, one passage having at least a portion extending into axial alignment with a body passage;
 a tube mounted in and extended through the body passage which is aligned with the plug passage and into register with the plug passage to maintain a sealed connection between the aligned body and plug passages as the plug rotates;
 a shaft extending a flat head into the access opening into the central chamber against the large face of the plug;
 pins mounted in the flat head of the shaft about the shaft and extending into the plug, one of the pins having an axial passage forming at least part of a passage in the plug from the smaller face to maintain pressure across the plug equalized, the pins coupling the plug and shaft together so the plug is rotated with the shaft;
 a closure plate over the access opening of the body which is sealed to the body and about the shaft;
 and a spring member between the closure plate and the plug to force the plug and chamber walls into a lubricated sealing engagement.

References Cited by the Examiner

UNITED STATES PATENTS

| | | | |
|---|---|---|---|
| 1,377,240 | 5/1921 | Willis | 251—310 |
| 2,448,206 | 8/1948 | Bailey | 251—310 |
| 2,449,733 | 9/1948 | Wilkening | 137—625.11 |
| 2,488,283 | 11/1949 | Franck | 137—625.11 |
| 2,707,613 | 5/1955 | Wheatley | 251—283 |
| 2,864,579 | 12/1958 | Stoltenberg | 251—368 |
| 3,038,694 | 6/1962 | Dunbeck et al. | 251—368 |
| 3,108,779 | 10/1963 | Anderson | 251—309 |

FOREIGN PATENTS

| | | |
|---|---|---|
| 1,194,532 | 3/1959 | France. |

M. CARY NELSON, *Primary Examiner.*

LAVERNE D. GEIGER, *Examiner.*

W. CLINE, *Assistant Examiner.*